US006429609B1

(12) United States Patent
Hugin

(10) Patent No.: US 6,429,609 B1
(45) Date of Patent: Aug. 6, 2002

(54) DRIVE DEVICE, ESPECIALLY FOR MOVING AND TURNING THE SLATS OF A BLIND IN A RUNNER

(75) Inventor: Walter Hugin, Efringen-Kirchen (DE)

(73) Assignee: Trietex Antriebstechnik GmbH, Efringen-Kirchen (DE)

( * ) Notice: Subject to any disclaimer, the term of this patent is extended or adjusted under 35 U.S.C. 154(b) by 0 days.

(21) Appl. No.: 09/719,121

(22) PCT Filed: Jul. 21, 1999

(86) PCT No.: PCT/DE99/02282

§ 371 (c)(1), (2), (4) Date: Dec. 6, 2000

(87) PCT Pub. No.: WO00/06865

PCT Pub. Date: Feb. 10, 2000

(30) Foreign Application Priority Data

Jul. 29, 1998 (DE) ........................................ 198 34 082

(51) Int. Cl.[7] .................................................. H02K 7/14

(52) U.S. Cl. .......................... 318/17; 318/16; 318/269; 318/273; 318/466; 318/439

(58) Field of Search ............................. 318/14, 15, 16, 318/17, 138, 254, 269, 273, 274, 439, 466–469; 160/DIG. 17, 7, 174 R, 176.1 R, 168.1 P, 310, 331

(56) References Cited

U.S. PATENT DOCUMENTS 5,495,153 A * 2/1996 Domel et al. ............... 318/254
5,511,601 A * 4/1996 Worthington ........ 160/186.1 R
6,181,089 B1 * 1/2001 Kovach et al. ............... 318/16
6,201,364 B1 * 3/2001 Will et al. .................. 318/466

FOREIGN PATENT DOCUMENTS

| | | |
|---|---|---|
| DE | 2223610 | 11/1973 |
| DE | 2504474 | 8/1976 |
| DE | 2554991 | 6/1977 |
| DE | 2708485 | 8/1978 |
| DE | 3048344 | 3/1982 |
| EP | 0012263 | 6/1980 |

* cited by examiner

*Primary Examiner*—Khanh Dang
(74) *Attorney, Agent, or Firm*—Horst M. Kasper

(57) ABSTRACT

In a drive device which is especially suitable for moving and turning the slats of a blind in a runner and in which the rotational movement of a drive wheel (2) can be alternately transmitted to a turning drive means effecting the rotational movement of the slats and to a transport drive means effecting the movement of the salts in the runner, the drive wheel (2) is driven by electric motor and, in addition, the shift of the change gear from its one shifting position into the other shifting position is effected by an electrical signal. For this purpose, a toothed sleeve (3) driving the transport drive means and a toothed sleeve (4) driving the turning drive means is alternately coupled to a drive tube (1), which can be driven via the drive wheel (2), in dependence on the relative rotational position of a reversing shaft (10) in the drive tube (1) via locking members (7, 8) arranged on its periphery. A brake disk (24) of magnetizable material, which faces an electromagnet (25), is mounted on the reversing shaft (10). When the electromagnet (25) is not excited, the reversing shaft (10) is rotationally entrained by the drive tube (1) and when the electromagnet (25) is excited, the brake disk (24) is attracted, the reversing shaft (10) thus held in its position and the drive tube (1) can be rotated with respect to the reversing shaft (1) against a restoring force.

8 Claims, 1 Drawing Sheet

DRIVE DEVICE, ESPECIALLY FOR MOVING AND TURNING THE SLATS OF A BLIND IN A RUNNER

CROSS-REFERENCE TO RELATED ART. (NOT APPLICABLE)

Figures 1, 2, 3, 4, 5, 6:
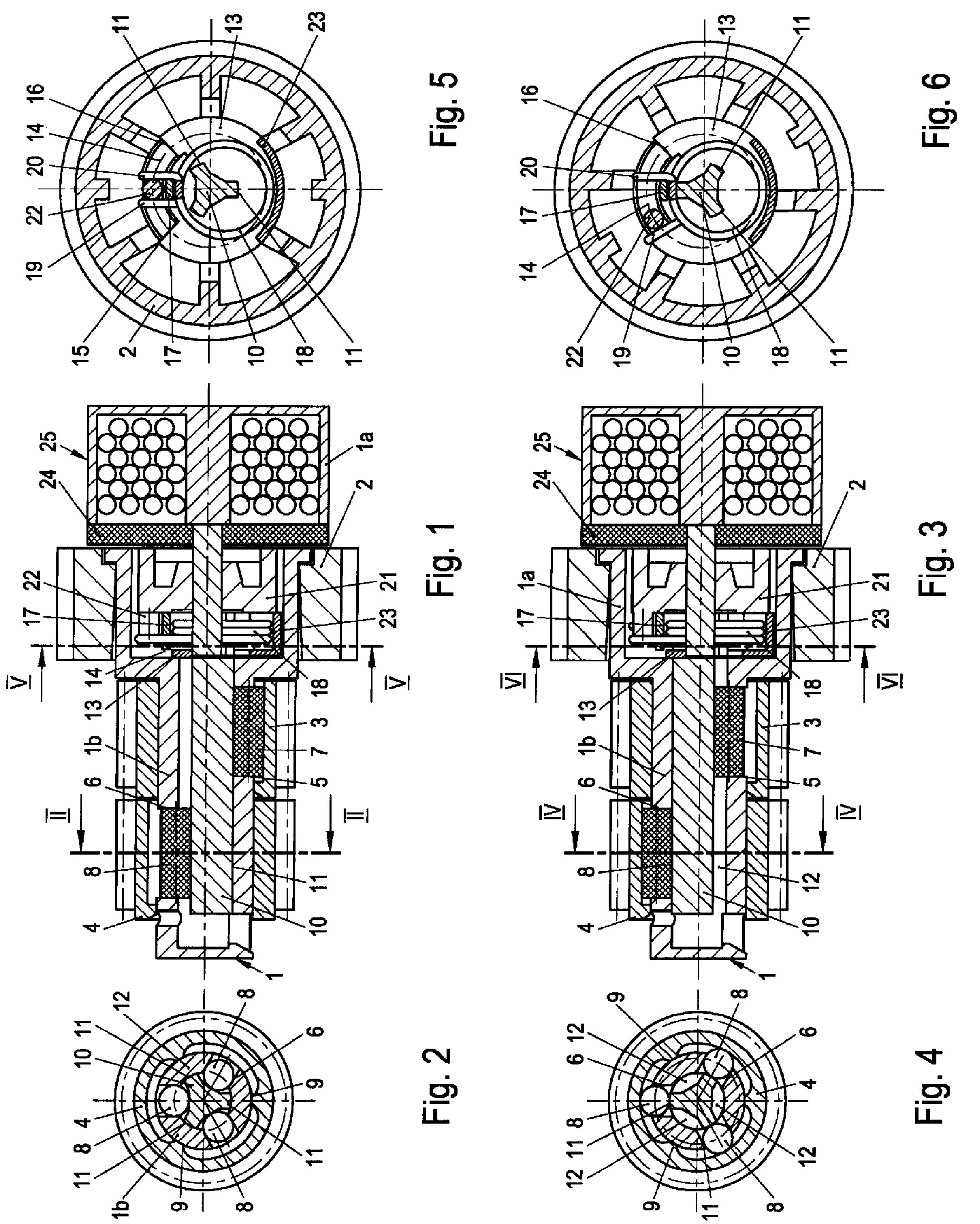

STATEMENT REGUARDING FEDERALLY SPONSORED RESEARCH OR DEVELOPMENT. (NOT APPLICABLE)

REFERENCE TO A "MICROFICHE APPENDIX" (SEE 37 CFR 1.96). (NOT APPLICABLE)

DESCRIPTION

BACKGROUND OF THE INVENTION

1. Field of the Invention

The invention relates to a drive device, especially for moving and turning the slats of a blind in a runner, wherein the rotational movement of a drive wheel can be alternately transmitted to a turning drive means effecting the turning movement of the slats by means of a change gear and to a transport drive means effecting the movement of the slats in the runner, wherein the change gear comprises a drive tube, which can be driven in both directions of rotation via the drive wheel, and a shaped reversing shaft extending coaxially to the drive tube, which can be rotated by a certain angle relative to one another, and wherein the drive tube is connected to a drive for the transport drive means to rotate therewith via locking members arranged offset in the longitudinal and peripheral direction over its periphery in dependence on the angular position of the reversing shaft with respect to the drive tube in one shifting position and is connected to a drive for the turning drive means to rotate therewith in another shifting position.

2. Description of the Related Art Including Information Disclosed Under 37 CFR 1.97 and 1.98.

Such a drive device is known from DE-A 2 223 610. In this arrangement, a drive wheel, which can be operated by a cord or chain pull, rotates a drive tube with which it is engaged. In the wall of this drive tube radially movable locking members are provided, offset with respect to one another both in the peripheral and in the longitudinal direction, which, depending on the position of a shaped shaft, which can also be rotated by the drive wheel via a driving device within the drive tube, are held in engagement with one of two toothed sleeves arranged behind one another on the drive tube or can be moved out of the area of engagement with the respective other toothed sleeve. A turning shaft effecting the turning of the slats can be driven via one of the two toothed sleeves and a transport spindle effecting the movement of the slats can be driven via the other one. By changing the direction of rotation at the drive wheel, the blind can thus be pulled open and shut by means of the longitudinal displacement of the slats, on the one hand, and, on the other hand, brought into a position allowing more or less light to pass in a state in which the blind is pulled shut wholly or partially, that is into a wholly or only partially closing position, by turning or rotating the slats around their longitudinal axis.

Since the blind cannot be pulled open, i.e. the slats cannot be pushed together not, without interference when the slats are in their completely closing turning position because they then abut one another, a further development of the said gear ensures that each directional change at the drive wheel is followed by a turning or rotating of the slats and the turning shaft is decoupled at the gear and the drive is shifted to the transport spindle only after a certain angle of rotation has been reached which goes beyond the closing of the slats.

Shifting from one shifting position to the other one is effected by a limited relative rotation between the drive tube and the shaped shaft and this relative rotation is made possible by a toothed disk which is permanently joined to the shaped shaft and has mirror-inverted locking teeth on both sides, with a driving and a sliding edge, which, on one side, can lock in to a notched disk permanently joined to the drive wheel and, on the other side, into a second notched disk permanently joined to the drive tube, wherein the drive tube, after the locking, is entrained by driving tabs which protrude into arc-shaped slots of the drive wheel and allow a relative rotation of the drive wheel with respect to the drive tube. The individual parts of the mechanical shifting arrangement are exposed to high torques and surface pressures during the operation which can lead to premature wear and also to disturbances due to jamming. To ensure as trouble-free operation of these drive devices as possible, it is necessary to maintain very small production tolerances in the parts of the mechanical shifting arrangement, which makes production more expensive.

Moreover, it has been found in practical application that the shifting process which is subdivided into a number of part-processes, and which requires a brief turning back and forward at the drive wheel with each shifting process for example, is considered to be too complicated by most users. Because of this complicated shifting process, this drive device is also not very suitable for an electric motor drive.

In DE 2 737 416 C2 and DE 25 54 991 B2, a gear is described in which the shaped shaft described above is held in a central rest position with respect to the drive tube, or always returned to this position in which the locking members, which can be radially moved in the drive tube, are held in engagement with the toothed sleeve via which the turning shaft is driven, by a restoring spring so that, when the drive wheel is turned, initially it is always the turning shaft which is first driven and, as a consequence, the slats are rotated, i.e. turned, around their longitudinal axis. At the transport spindle, a free run, limited in both directions by a roller and by a stop, is provided which allows a next toothed sleeve meshing with the second tooth sleeve driven by the drive tube to rotate loosely on the transport spindle up to the end of the free run. At the end of the free run, a non-positive connection is obtained between the transport spindle and the toothed sleeve which rotates loosely on the former up until then, so that the transport spindle is now entrained in the rotation. Due to the higher torque to be transmitted by the drive tube during this process, the shaped shaft is pivoted against the force of the restoring spring inside the drive tube and relative to the latter by a driving device, to such an extent that, as a result, the toothed sleeve driving the turning shaft is decoupled.

The transport spindle which is now coupled on alone effects the movement of the slats in the runner. The angle at which the slats are positioned with respect to the running direction here always corresponds to one of the end turning positions of the slats and is determined by the length of the free run; it is approx. 150° in both directions. To ensure the shifting from turning to moving, a braking device which can be adjusted by means of an adjusting screw is also provided on the free-run shaft, by means of which the higher torque required for the shifting can be increased again.

While the drive wheel can also be driven by electric motor instead of with the aid of a cord or chain pull in this case, the shifting from drive to the turning shaft to drive to the transport spindle is done purely mechanically. Because of the large torques occurring during this process, individual parts, especially of the limited free run in its end positions, are subject to high loading. The forces and surface pressure occurring during this process can lead to wear and also to jamming as a consequence of production tolerances. In addition, it is no longer possible subsequently to change or adapt the number of idle rotations between the toothed sleeve and the transport spindle driven by it.

It has also been found that, in spite of the angular position of the slats of 150° with respect to the running direction during the movement of the slats, the latter tend to become hooked together, especially if they are loosely connected to one another by beaded strings at their freely suspended ends or if the runner is attached to an inclined surface, for example a roof slope. The slats also require a relatively large amount of space on the side, e.g. of a window, in the pushed-together state, that is to say when the blind is open, with an angular position of approx. 150°.

BRIEF SUMMARY OF THE INVENTION

It is the object of the invention to create a drive device of the type initially mentioned, the change gear of which is suitable for an electric motor drive and in which too high a load on individual parts of the change gear, and this their premature wear, is avoided. Fewer individual parts which have to be manufactured with high precision should be required and thus the production costs lowered. It should be possible for the slats of a blind to move in a trouble-free manner, especially without becoming hooked into each other and impeding one another, along the runner for pulling the blind open and shut and, in addition, to rotate them continuously in both directions between a wholly and an only partially closing rotating or turning position in each position of movement of the slats in order to regulate by this means the incidence of light. The shifting process from turning to moving and conversely should be simplified in such a manner that it, too, and not only the movement itself, can be effected by electrical or electronic means so that the device also becomes bus-capable for the central operation and control of a number of blinds individually or in groups. Trouble-free operation should be guaranteed.

According to the invention, this is achieved by the fact that the reversing shaft is connected to a magnetizable brake disk which faces a stationary electromagnet to rotate therewith and that when current flows through the induction coil of the electromagnet, the brake disk is pulled against the electromagnet 25 and thus the reversing shaft is stopped against rotation and the drive tube can be rotated by an angle corresponding to the two shifting positions relative to the reversing shaft whilst when the induction coil of the electromagnet is without current, the reversing shaft and brake disk can be rotated together with the drive tube.

In this manner, the shifting process based on a relative rotation between drive tube and reversing shaft can be carried out by an electrical signal. The shifting process puts much less load on the individual mechanical parts than in known devices so that premature wear and also operational disturbances, e.g. due to jamming are avoided. The slats of the blind can also be rotated about their longitudinal axis in any intermediate moving position and not only, as known, when the blind is completely closed, and thus the incidence of light can be regulated. The drive device is distinguished by a compact space-saving type of construction and the production costs are considerably reduced.

In accordance with a preferred embodiment, the drive tube and the reversing shaft and brake disk are held in a center position corresponding to one shifting position of the change gear with respect to one another by the force of a restoring spring where the induction coil of the electromagnet is without current, and can be jointly rotated, but when current flows through the induction coil of the electromagnet, the drive tube is rotated by the angle corresponding to the other shifting position relative to the reversing shaft against the force of the restoring spring. The change gear of the drive device according to the invention can thus be advantageously shifted in both directions.

As an alternative, the drive tube and the reversing shaft can be held in the one shifting position with respect to one another, in which they can be jointly rotated, when current flows through the induction coil of the electromagnet; when the induction coil of the electromagnet is without current, the drive tube can then be rotated by an angle corresponding to the other shifting position of the change gear with respect to the reversing shaft by means of a braking force, e.g. of a brake spring.

The exciter current for the electromagnet is preferably switched on and off in dependence on the angular position of the slats of the blind with respect to the direction of movement. It is then possible to avoid the slats becoming hooked together or otherwise impedeing one another by bringing the slats into a certain angular position, preferably 90° with respect to the direction of movement before they are moved.

The exciter current for the electromagnet can be switched on and off by means of an electronic circuit in dependence on time or analog values or number of pulses.

According to a preferred embodiment of the invention, when the drive device is operated the position of movement of the slats in the runner and their angular position with respect to the direction of movement can be electronically detected and the exciter circuit for the electromagnet can be closed or interrupted in dependence on these two positions of the slats.

The change gear can preferably be held in the shifting position driving the transport drive means only at a defined angular position of the slats of approx. 90° with respect to the direction of movement, or brought into this shifting position. In this angular position of the slats, they cannot impede each other during the movement in the runner, especially also on a slope.

In the case of an angular position of the slats deviating from approx. 90° with respect to the direction of movement, first the change gear is brought into the shifting position driving the turning drive means when the drive device is operated.

It is only in the end position of movement of the slats, which corresponds to the completely opened blind, that the change gear cannot be brought into the shifting position driving the turning drive means because in this case they are automatically located in the correct and also space-saving angular position of approx. 90° with respect to the direction of movement for a movement in the reverse direction at the end of a preceding moving process; this ensures that the slats, on the one hand, can be rotated, that is to say turned, about their axis, both with the blind pulled shut and also in any intermediate position of movement, for regulating the incidence of light, and, on the other hand, with the blind completely opened when the slats are hanging closely next to one another in the angular position of 90°, their rotation and thus interference can be avoided.

Since the moving of the slats normally requires a longer period of time than the turning, it is considered to be advantageous if, where the induction coil of the electromagnet is without current, the shifting position assumed by the change gear is the one in which the transport drive means for moving the slats in the runner can be driven, and the shifting position assumed by the change gear when current flows through the induction coil of the electromagnet is the one in which the turning drive means for rotating or, respectively, turning the slats can be driven.

Due to the fact that the circuit of the change gear is electronically controlled, together with the electric motor drive of the drive device, the latter is also provided with bus capability. A number of motors, that is to say a number of blinds, can be operated and controlled centrally via a bus system individually or in groups.

The device is preferably driven with the aid of synchronous motors; these have the advantage that, in contrast to, for example, DC motors, they always run evenly. This attains special significance in the case of blinds, the slats of which are carried in a runner at both ends. Such a two-sided guidance can be of advantage, for example in the case of very long slats and/or very windy installations or could also be required, for example, in the case of roof windows or in the case of horizontally arranged slats.

BRIEF DESCRIPTION OF THE SEVERAL VIEWS OF THE DRAWING(S)

In the text which follows, the invention will be described in greater detail by way of example in a preferred embodiment with reference to the appended drawings, in which:

FIG. 1 shows a longitudinal section through a preferred embodiment of a change gear for a drive device according to the invention in one shifting position, FIG. 2 shows a cross section through the change gear according to FIG. 1 along section line II—II in FIG. 1, FIG. 3 shows a longitudinal section through the change gear according to FIG. 1 in its second shifting position, FIG. 4 shows a cross section through the change gear along section line IV—IV in FIG. 3, FIG. 5 shows a cross section through the change gear along section line V—V in FIG. 1, and FIG. 6 shows a cross section through the change gear along section line VI—VI in FIG. 3.

DETAILED DESCRIPTION OF THE INVENTION

A drive tube 1 is subdivided by a gradation into a wider section 1*a* and a narrower section 1*b*. A drive wheel 2 constructed as toothed sleeve, which meshes with a toothed wheel, not shown, which can be driven by an electric motor, preferably a synchronous motor, is pushed onto the wider section 1*a* of the drive tube 1 and connected to the latter to rotate therewith. A first 3 and second toothed sleeve 4 are arranged rotatably but secured against longitudinal movement on the narrower section 1*b* of the drive tube 1. In the area of coverage of the two toothed sleeves 3 and 4, two, preferably three, groups of openings 5 and 6 are provided offset with respect to one another in the peripheral direction and in the longitudinal direction in the wall of the drive tube 1, in which openings locking members 7 and 8, preferably in the form of rollers, are arranged to be radially moveable and can be brought into or out of engagement with driving noses 9 constructed on the inside wall of the respective tooth sleeve 3 and 4. As can also be seen from FIGS. 2 and 4, the radial movement of the locking members 7 and 8 in the openings 5 and 6 is effected by a reversing shaft 10 which coaxially extends in the drive tube 1 and which exhibits a triangular profile, at least in the narrower section 1*b* of the drive tube 1 in the embodiment shown, wherein the rounded corners of the triangle form projections 11 sliding along the inside wall of the narrower section 1*b* of the drive tube 1 and the sides of the triangle form indentations 12 with respect to the wall of the drive tube 1 surrounding them. The drive tube 1 and the reversing shaft 10 can be rotated relative to one another. Depending on the position of the reversing shaft 10 in the drive tube 1, the locking members 7 or 8 are pushed radially outward by the projections 11 of the reversing shaft 10 in the area of coverage of one of the two toothed sleeves 3 or 4 and are brought or held in engagement with the driving noses 9 of the relevant toothed sleeve 3 or 4 so that a rotationally fixed connection is established (see FIG. 4) whilst the locking members 8 or 7, which are offset in the peripheral direction, can escape into the indentations 12 of the reversing shaft 10 in the area of coverage of the other toothed sleeve 4 or 3 and thus this toothed sleeved 4 or 3 is decoupled from the drive tube 1, the drive tube 1 can therefore rotate freely within this decoupled toothed sleeve 4 or 3 (see FIG. 2). A turning drive means, e.g. a turning shaft, for rotating the blind slats can be driven via one of the two toothed sleeves 3 and 4 in a manner known per se, whilst a transport drive means, e.g. a transport spindle, for moving the blind slats can be driven via the other toothed sleeve 4 or 3. In the text which follows, it will be assumed that a transport spindle can be driven via the toothed sleeve 3 in the shifting position shown in FIG. 1 whilst a turning shaft is driven via the toothed sleeve 4 in the other shifting position according to FIG. 3.

On the part of the reversing shaft 10 protruding through the wider section 1*a* of the drive tube 1, a round cam disk 13 is arranged to rotate therewith. A circular sector-shaped recess 14 on the periphery of this cam disk 13 forms two stops 15 and 16 (see FIGS., 5 and 6). In the center between these two stops 15 and 16, an axial extension 17 is molded onto the cam disk 13. A restoring spring 18 placed in a spiral once or several times loosely around the reversing shaft 10 engages with its two leg ends 19 and 20 crossed-over, on the one hand, on the extension 17 of the cam disk 13 and, on the other hand, on a stud 22 protruding from the drive tube 1 or a molded part 21 permanently connected to the latter. The reversing shaft 10 is thus held in a central position with respect to the drive tube 1, in which position, as will still be explained below, preferably the toothed sleeve 3, via which the transport spindle is driven for moving the slats, is always coupled to the drive tube 1 whilst the toothed sleeve 4 driving the turning shaft can be loosely rotated with respect to the drive tube 1 (see FIG. 1). An axial projection 23 which, together with the cam disk 13, forms a hollow space for the partial accommodation and for the protection of the restoring spring 18 can be provided on the cam disk 13 diagonally opposite the recess 14.

On the section of the reversing shaft 10 protruding from the wider section 1*a* of the drive tube 1, a brake disk 24 of magnetizable material is arranged to rotate therewith and, following the brake disk, leaving an airgap, an electromagnet 25 is arranged in a stationary manner, in which the reversing shaft 10 is rotatably supported and which can be excited and deexcited controlled by electronics. When the induction coil of the electromagnet 25 is without current, the reversing shaft 10 is held in its central position by the restoring spring 18 with respect to the drive tube 1, i.e. when the drive tube 1 is driven in one direction via the drive wheel 2 by an electric motor, the reversing shaft 10 and cam disk 13 and brake disk 24 are entrained in this rotation by the force of the restoring spring 18 and the change gear remains in the shifting position assumed, in which the transport spindle of the blind is preferably driven via the toothed sleeve 3 which is connected to the drive tube 1 to rotate therewith (see FIGS. 1 and 5).

If current is fed to the induction coil of the electromagnet 25, the electromagnet field being built up attracts the brake disk 24 to the electromagnet 25 and thus the reversing shaft 10 and cam disk 13 are also held in their position. The drive tube 1 which is now driven further via the drive wheel 2 rotates with respect to the reversing shaft 10 against the force of the restoring spring 18 until the stud 22, permanently connected to it, abuts against one of the two stops 15 or 16 of the cam disk 13 (see FIG. 6). In this relative movement between drive tube 1 and reversing shaft 10, the change gear assumes its other shifting position in which the projections 11 of the reversing shaft 10 move the locking members 8 radially outward in the openings 6 of the drive tube 1 and into the range of movement of the driving noses 9 of the toothed sleeve 4 driving the turning shaft, the latter thus being coupled to the drive tube 1, and in which the locking members 7 can escape into the indentations 12 of the reversing shaft 10 in the openings 5 of the drive tube 1 which are offset in the peripheral and longitudinal direction, so that the toothed sleeve 3 driving the transport spindle is decoupled from the drive tube 1 (FIGS. 3 and 4).

If the exciter current of the induction coil is interrupted, the brake disk 24 is no longer kept attracted to the electromagnet 25. The restoring spring 18 which has been deflected from its rest position and is correspondingly tensioned now attempts to restore the cam disk 13 and its associated reversing shaft 10 back to the central rest position with respect to the drive tube 1 so that the change gear resumes its first shifting position for moving the slats in their runner. Thus, shifting of the transport spindle to the turning shaft and conversely is effected by an electrical command from an electronic control.

Since the turning of the slats is the shorter process in terms of time in comparison with their movement in the runner, it is preferred, as described, to allow the change gear to assume the shifting position effecting the turning of the slats when current flows through the induction coil of the electromagnet 25 whilst the moving of the slats is effected where no current flows through the induction coil; in principle, however, it is also possible to reverse the procedure.

So that the slats cannot become hooked together or otherwise impede one another in any way when they are moved in the runner, the slats are moved at an angular position of the slats with respect to the direction of movement which is predetermined by the electronics, advantageously at an angular position of about 90° to be specific. If, accordingly, the slats are always at right angles to the direction of movement during the movement, they cannot only not impede one another but the additional advantage is obtained that they take up less space in the completely pushed-together state, that is to say when the blind is completely opened, on the side, for example of a window, than if they are at another angle, and they can there be covered by a relatively narrow panel which is frequently desirable for esthetic reasons.

When the drive device is operated, both the position of movement and the turning position of the slats can be advantageously detected by suitable probes, e.g. by a light barrier and/or a hall element by the electronics controlling, e.g. opening and closing, the exciter circuit of the electromagnet 25, and the exciter circuit of the electromagnet 25 can be controlled in dependence on these positions.

Assuming the slats are in their position where they are completely pushed together on one side of the runner and are thus mandatorily in the angular position of approx. 90° to the direction of movement which is preferred for the movement, the electromagnet is not excited when the drive device is operated since it is not necessary to rotate the slats for the subsequent movement closing the blind.

If the slats are in their other end position of movement or in an intermediate position when the drive device is operated, first the electromagnet 25 is excited and accordingly the change gear is brought into its position driving the turning shaft. The slats are then rotated about their axis, controlled for example by time or by analog values or number of pulses, until either the desired incidence of light through the blind or again the angular position of approx. 90° to the direction of movement is achieved in order to be able to initiate a new moving process. The electronics can detect from the duration of operation of the drive device by an operator at an operating switch whether it is only desired to turn the slats for regulating the incidence of light or turning with subsequent movement of the slats.

As already mentioned, each of the devices is preferably driven by a synchronous motor. These have the advantage that, in contrast to, for example, DC motors, they always run evenly. This is of particular significance if the slats of the blind are guided and driven in a runner at both ends. It can be seen quite easily that in such a blind, trouble-free operation is only possible when the drive motors on both sides of the slats run absolutely uniformly. Guiding the slats on both sides is especially advantageous in the case of relatively long slats or in very windy installations; they are even required on roof windows or in the case of horizontally arranged slats.

LIST OF REFERENCE DESIGNATIONS:

1 Drive tube
1*a* Wider section
1*b* Narrower section
2 Drive wheel
3 First toothed sleeve
4 Second toothed sleeve
5,6 Openings
7,8 Locking members
9 Driving noses
10 Reversing shaft
11 Projections
12 Indentations
13 Cam disk
14 Recess
15,16 Stops
17 Extension
18 Restoring spring
19,20 Leg ends Molded part
22 Stud
23 Projection
24 Brake disk
25 Electromagnet

What is claimed is:

1. A drive device, especially for moving and turning the slats of a blind in a runner, wherein the rotational movement of a drive wheel (2) can be alternately transmitted to a turning drive means effecting the turning movement of the slats by means of a change gear and to a transport drive means effecting the movement of the slats in the runner, wherein the change gear comprises a drive tube (1), which can be driven in both directions of rotation via the drive wheel (2), and a shaped reversing shaft (10) extending coaxially to the drive tube (1), which can be rotated by a certain angle relative to one another, and wherein the drive tube (1) is connected to a drive for the transport drive means to rotate therewith via locking members (7, 8) arranged offset in the longitudinal and peripheral direction over its periphery in dependence on the angular position of the reversing shaft (10) with respect to the drive tube (1) in one shifting position and is connected to a drive for the turning drive means to rotate therewith in another shifting position, characterized in that the reversing shaft (10) is connected to a magnetizable brake disk (24), which faces a stationary electromagnet, to rotate therewith and that when current flows through the induction coil of the electromagnet (25), the brake disk (24) is pulled against the electromagnet (25) and thus the reversing shaft is stopped against rotation and the drive tube (1) can be rotated by an angle corresponding to the two shifting positions relative to the reversing shaft (10) whilst when the induction coil of the electromagnet (25) is without current, the reversing shaft (10) and brake disk (24) can be rotated together with the drive tube (1).

2. The drive device according to claim 1, characterized in that the drive tube (1) and the reversing shaft (10) and brake disk (24) are held in a center position corresponding to one shifting position of the change gear with respect to one another by the force of a restoring spring (18) where the induction coil of the electromagnet (25) is without current, and can be jointly rotated, but when current flows through the induction coil of the electromagnet (25), the drive tube (1) can be rotated by the angle corresponding to the other shifting position relative to the reversing shaft (10) against the force of the restoring spring (18).

3. The drive device according to claim 1 or 2, characterized in that the exciter current for the electromagnet (25) can be switched on and off in dependence on the angular position of the slats of the blind with respect to the direction of movement.

4. The drive device according to groups claim 3, characterized in that the exciter current for the electromagnet (25) can be switched on and off by means of an electronic circuit in dependence on time or analog values or number of pulses.

5. The drive device according to claim 3, characterized in that when the drive device is operated, the position of movement of the slats in the runner and their angular position with respect to the direction of movement can be electronically detected and the exciter circuit for the electromagnet (25) can be closed or interrupted in dependence on these two positions of the slats.

6. The drive device according to claim 5, characterized in that the change gear can be held in the shifting position driving the transport drive means, or can be brought into this shifting position, only at a defined angular position of the slats of approx. 90° with respect to the direction of movement.

7. The drive device according to one of claims 1 to 6, characterized in that the shifting position assumed by the change gear where the induction coil of the electromagnet (25) is without current is the one in which the transport drive means for moving the slats in the runner can be driven, and the shifting position assumed by the change gear when current flows through the induction coil of the electromagnet (25) is the one in which the turning drive means for rotating or turning the slats about their own axis can be driven.

8. The drive device according to one of the preceding claims, characterized in that the slats of a blind are guided in a runner at both their ends and drive is in each case effected by a synchronous motor via a drive device according to the invention.

* * * * *